United States Patent

Fenwick et al.

[11] Patent Number: 6,075,906
[45] Date of Patent: *Jun. 13, 2000

[54] SYSTEM AND METHOD FOR THE SCALING OF IMAGE STREAMS THAT USE MOTION VECTORS

[75] Inventors: Stephen C. Fenwick, Mountain View; Timothy J. Van Hook, Menlo Park; Gregory Humpreys Efland, Palo Alto, all of Calif.

[73] Assignee: Silicon Graphics Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/572,299

[22] Filed: Dec. 13, 1995

[51] Int. Cl.[7] .............................. G06K 9/36; G06K 9/38; H04N 9/74; H04N 1/393
[52] U.S. Cl. ...................... 382/298; 382/248; 382/250; 382/251; 382/253; 348/581; 358/451
[58] Field of Search .................... 382/236, 248, 382/250, 251, 252, 253, 298, 232; 348/402, 413, 411, 581; 358/451

[56] References Cited

U.S. PATENT DOCUMENTS

| | | | |
|---|---|---|---|
| 5,008,746 | 4/1991 | Bernard et al. | 348/389 |
| 5,198,901 | 3/1993 | Lynch | 348/413 |
| 5,469,273 | 11/1995 | Demura | 382/232 |
| 5,485,279 | 1/1996 | Yonemitsu et al. | 348/411 |
| 5,557,341 | 9/1996 | Weiss et al. | 348/699 |
| 5,635,985 | 6/1997 | Boyce et al. | 348/402 |

OTHER PUBLICATIONS

International Standard, ISO/IEE "Coding of Moving Pictures and Associated Audio for Digital Storage Media at up to about 1.5 Mbit/s," Information Technology ISO/IEC 11172–2, 1993.

Shih–Fu Chang and David G Messerschmitt, "Manipulation and Compositing of MC–DCT Compressed Video", *IEEE Journal on Selected Areas of Communications*, vol. 13, No. 1, pp. 1–11, Jan. 1995.

*MPEG–2 Specification*, DIS Level, "Generic Cooling of Moving Pictures And Associated Audio Information: Video, Recommendation H.62, ISO/IEL 13818–2, Draft International Standard, Chapter 7: The Video Decoding Process", May 10, 1994, pp. 63–118.

*Primary Examiner*—Phuoc Tran
*Assistant Examiner*—Daniel G. Mariam
*Attorney, Agent, or Firm*—Sterne, Kessler, Goldstein & Fox P.L.L.C.

[57] ABSTRACT

A system and method for scaling image streams that use motion vectors is disclosed. The system combines an error term with a predicted term in order to produce a display value. The system operates on image components represented in the spatial and frequency domains. The system processes motion vectors in the spatial domain. The motion vectors are scaled. The integral part of the scaled motion vector addresses a framestore. The fractional portion of the scaled motion vector is input to a nonlinear filter which determines the value of image components for a location that does not correspond with an image location in the framestore. The output of the nonlinear filter comprises the predicted terms. Data in the frequency domain is processed more efficiently by reducing the size of a block of data by appropriate filtering. The resulting data is transformed to the spatial domain.

14 Claims, 2 Drawing Sheets

SYSTEM AND METHOD FOR THE SCALING OF IMAGE STREAMS THAT USE MOTION VECTORS

BACKGROUND OF THE INVENTION

1. Field of the Invention

The present invention relates generally to the field of image processing. More particularly, the present invention relates to the scaling of image streams that use motion vectors.

2. Related Art

In response to more technically demanding audio-video consumers, suppliers of audio-video components have provided high-definition television, video-on-demand and set-top devices. To allow for cross-compatibility between newly developed systems, a panel of experts has developed an international standard for generic coding of moving pictures and associated audio information. This standard, designated MPEG (see the Motion Picture Experts Group-2 Specification ISO/IEC JTC1/SC29/WG11 N0702, May 10, 1994), includes standards for video image compression and decompression.

Video image compression takes advantage of redundant information inherent in moving pictures. With the exception of scene changes, successive frames of a moving picture do not change substantially in form or content. This is because there is typically little change of information from one frame to the next. Thus, there is no need to directly encode all image components (pixels, YUV format, etc.) of each frame for transmission purposes. The bandwidth saved by not sending all information for each frame may be used to send a different frame.

Picture-in-Picture (PIP) displays a reduced size image in a display of a full-size image. A reduced-sized image is called a scaled image, and the process for reducing the size of the image is called scaling. Typically, scaled images are not transmitted by service providers, such as local cable television companies. Therefore, a device located at the consumer's location must perform any required scaling.

It is desirable to be able to process and present reduced-size video streams for applications such as PIP in set-top decoder products, and the like. However, due to limited resources and cost constraints, set-top decoder products rarely have sufficient processing power or memory resources to decode multiple full-size images simultaneously. Thus, it is not desirable to decode a full stream, and scale it after all decoding is complete.

Methods for image scaling have been proposed by Dr. Chang et al., in an article titled "Manipulation and Compositing of MC-DCT Compressed Video," (IEEE Journal on Selected Areas of Communications, Vol. 13, No. 1, January, 1995). Chang et al.'s method operates entirely in the discrete cosine transform (DCT) domain, which complicates its implementation from memory and computation perspectives. Unfortunately, Chang et al.'s method is subject to variable throughput problems, and applies additional DCTs for motion compensation scaling. Furthermore, Chang et al.'s method, because it is done exclusively in the frequency domain, is subject to undesirable visual artifacts which are not easily removed.

What is needed is a system for scaling video streams in the spatial domain that is applicable to a system with limited resources, such as set-top boxes, while avoiding unnecessary consumption of transmission bandwidth between the service provider and the system.

SUMMARY OF THE INVENTION

It is desirable to support one full-scale video stream and one or more scaled video streams, e.g., a PIP video stream, simultaneously. Due to memory and processor limitations, operating on two or more full-scale video streams followed by reducing one or more of the streams for scaled display is impractical. The present invention achieves the desired operation by operating on reduced size images and decimated images in a manner such that image quality is not compromised.

The present invention is directed to a system and method for scaling an image stream according to a scale factor by separating a block of data corresponding to a frequency domain representation of a block of error terms from the image stream. The block of error terms is filtered to produce a reduced-size, low-pass filtered block. The low-pass filtered block is inverse quantized to produce an inverse quantized block. A decimated block of error terms is generated by selectively transforming portions of the inverse quantized block to the spatial domain according to a scale factor and nullifying other portions. The system and method also address an image framestore with a scaled motion vector to obtain a block of image components. The block of image components is transformed, through a filter, into a block of predicted terms. The system and method then combines error terms with the corresponding predicted terms to form a block of display pixels.

The present invention reduces the computational cost of the inverse discrete cosine transform (IDCT), the inverse quantization, and the motion compensation, at the cost of some additional processing of predictor image components generated by motion compensation. The present invention operates on proportionately smaller reference frames, so that the memory and computational resources conventionally required by the decoding process are reduced in proportion to the size of the displayed image. Thus, the framestores for these, and for the computed image, is reduced to the size of the displayed image.

The present invention uses a nonlinear filter in the spatial domain during motion compensation to maintain image quality over a large number of predictor frames, which would otherwise accumulate errors resulting from drift between the encoder and decoder. Additionally, the present invention can scale virtually any image stream that uses motion vectors to a reduced size in such applications as video texturing and movie previews.

Further features and advantages of the present invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
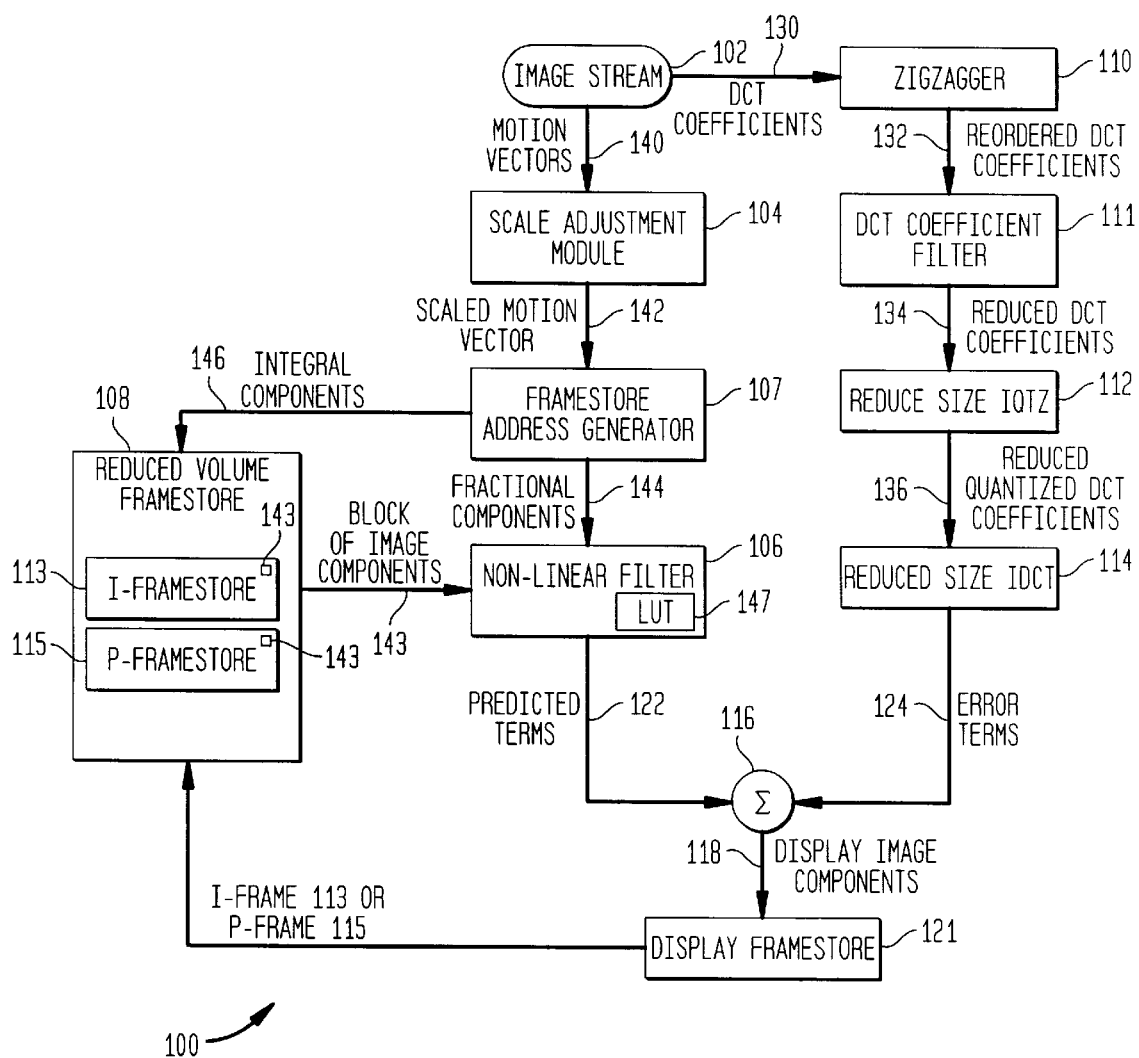
FIG. 1 is a system 100 for processing a video image stream containing motion vectors according to the preferred embodiment of the present invention.

The present invention is directed to efficiently processing a video stream, preferably encoded using a process similar to that used in MPEG-2, containing a representation of an image that is to be scaled. For example, the full-size image can comprise 640×480 image components and the scaled image can comprise 320×240 image components. A scale factor is defined as the ratio of the size of a scaled image to the size of an unscaled image (full image). Thus, the scale factor in the preceding example is one half (½). Such reduced size images may be used in picture-in-picture (PIP) displays offered by more modern television systems.

An image stream is preferably a bit stream that contains bits that represent images. As used in this specification, an image stream can contain an image. In other words, an image bitstream can contain a stream of bits that represents an image.

In an alternative preferred embodiment of the present invention, the scale factor is multidimensional. That is, the scale factor is an s-tuple, where s corresponds to the number of dimensions, and each component of "s" is a scale factor for a particular dimension. For example, an image may be represented by the 2-tuple (½, ¼), where ½ corresponds to the horizontal dimension and ¼ corresponds to the vertical dimension. It would be apparent to one of ordinary skill in the art that other representations are possible.

It would also be apparent to one of ordinary skill in the art that the desired scale factor can be input to the system in a variety of ways. Included among them are allowing the user to tune the system by choosing a scale factor, setting a fixed scale factor, or transmitting the scale factor in the image stream. The latter technique allows a service provider to broadcast emergency or other information to a customer.

The present invention achieves efficiency in processing scaled images by reducing the size of memory arrays containing image components of images. In the context of the present invention, reduced size refers either to reducing the size of an image component array or to setting the values of particular components in an image component array to zero. For example, all image components in the image component array beyond a particular row and column can be set to zero. Such reduction eliminates the need to process that particular portion of the image component array in subsequent processing steps.

The conventional MPEG-2 computational unit is an 8×8 block of image components. Image components are pixels or a format comprising a luminance value and a chrominance value. A pixel is a picture element. A picture element conventionally comprises multiple color components. A conventional pixel consists of 3 8-bit color components. It is well known, however, that other combinations of components having varying resolutions may be used. Several formats for luminance and chrominance values are described in the MPEG-2 standard referenced above. A block is an array of image components.

Figure 2:
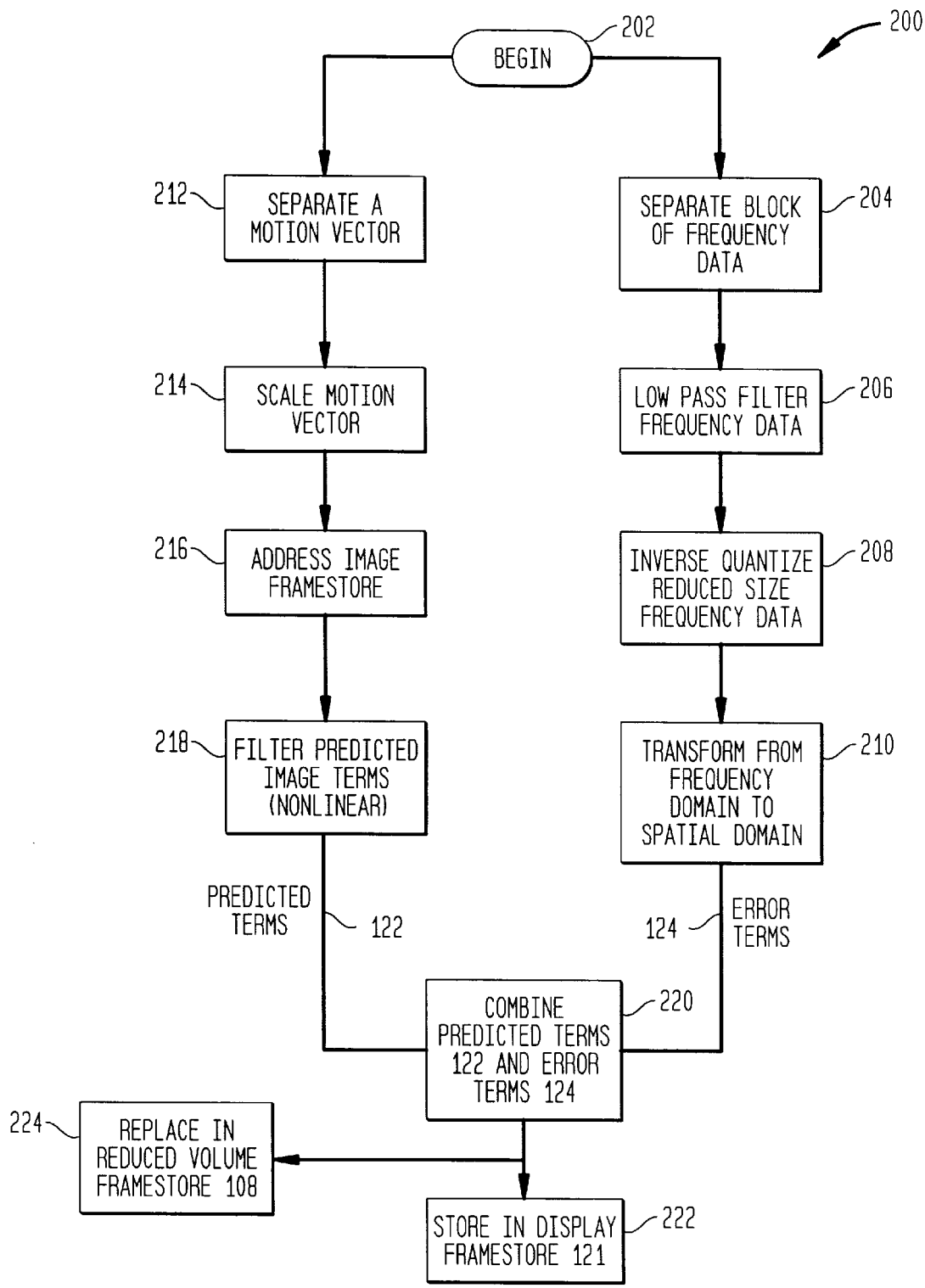
FIG. 2 is a method 200 for processing a video image stream containing motion vectors according to the preferred embodiment of the present invention.

Referring to FIG. 2, a method for processing a video image stream 200 according to the preferred embodiment of the present invention will be described. The method starts with begin step 202, wherein the method immediately executes steps 212 and 204. An image stream is transmitted for processing by the method during the begin step 202. The sequence of steps 204, 206, 208, and 210 can occur substantially simultaneously with the sequence of steps 212, 214, 216, and 218. The two sequences of steps can occur asynchronously, with the results of each step synchronized at step 220 before the final image is stored in a display framestore (described below with reference to FIG. 1).

In step 204, the method separates a block of data corresponding to a quantized frequency domain representation of the error terms of a transmitted image from the transmitted image stream. In the preferred embodiment of the invention, the block of data is an 8×8 array of image components which have been transformed by a discrete cosine transform (DCT) to the frequency domain and quantized. Typically, the image components are separated RGB, YUV, or YCrCb picture elements.

It is well known that the image components may be subsampled. Subsampling of an image component means that not every pixel of an image is sampled to produce the image component. For example, it is well known to estimate intensity using a full scale (all pixels) representation, while estimating color using subsampling (not all pixels).

Following separation step 204, the method low pass filters the data in step 206. The preferred embodiment of the present invention low pass filters by zeroing all values in the block of data located outside a particular range of horizontal and vertical indices. The range of indices is determined by the ratio of a size of a scaled image to a full-size image. Because the values outside of a particular range are set to zero, there is no need to save those values for subsequent processing, or to store those values in the system's memory. Hence, the resulting data is considered to be of a reduced size. The system's memory comprises a buffer in which blocks of data are processed. Conservation of system memory resources is discussed below.

The method inverse quantizes the data in step 208. Inverse quantization involves putting the data back to the levels from which it was quantized.

Following inverse quantization the method performs an inverse discrete cosine transform (IDCT) on the reduced block of data in step 210. The IDCT transforms the data from the frequency domain to the spatial domain. In addition, the spatial-domain data may be decimated during this step. The amount of decimation, as described above, is proportional to the scale factor, i.e., the ratio of the scaled image to the fall-size image. The output of step 210 is a reduced block of error terms.

The sequence of steps 212, 214, 216, and 218 may occur substantially simultaneously with the sequence of steps 204, 206, 208, and 210. In step 212, the method separates an unscaled motion vector from the image steam. A motion vector represents a distance between a block being reconstructed and a block in the reference frame in unscaled reference frame units. The reference frame is a base framestore to which adjustments according to the present invention are made. The unscaled reference frame units provide a coordinate system for the reference frame. The block in the reference frame is used as a reference from which the image is reconstructed.

In step 216, the method uses the motion vector to address a reduced volume framestore (described below with reference to FIG. 1). Because the scaling of the motion vector in step 214 may result in the motion vector having fractional components, only the integral portion of the motion vector is used for the address. The integral portion of the motion vector addresses a block of image components in the reduced volume framestore.

In step 218, the method filters the addressed data. Because the motion vectors often contain fractional parts, due to divisions required by scaling, the actual address pointed to by the motion vector is offset from the integral address used.

Thus, the method requires a mechanism for estimating the value of an image component at some point offset from the exact location addressed. According to the preferred embodiment of the present invention, nonlinear filtering provides this estimation. Nonlinear filtering estimates the value of image elements at locations offset from the actual coordinates of images stored in the reduced volume framestore. The result of the filtering is a reduced size block of predicted terms (described below with reference to FIG. 1).

In step 220, the method combines predicted terms and error terms (described below). In the preferred embodiment of the present invention the combination is a summation. In step 222, the method saves the reduced size result of the combination of predicted terms 122 and error terms 124 in display framestore 121 at an address indicated by the integral component of the motion vector. In step 224, the method transfers data in the display framestore to the reduced volume framestore. In a preferred embodiment of the present invention, the reduced volume framestore comprises an I- and a P-framestore (described below).

Referring to FIG. 1, a system for processing an image stream 100 according to a preferred embodiment of the present invention is illustrated. An image stream 102 is input to the system 100. An example of such an image stream 102 is a conventional MPEG-2 image stream. An MPEG-2 image stream may be encoded using well known variable length coding (VLC) algorithms. The image stream 102 includes error term information and motion compensation information in the form of a motion vector 140. Error term information in conventional MPEG-2 systems is transmitted in the form of discrete cosine transform (DCT) coefficients 130. In MPEG-2, DCT coefficients are processed as an 8×8 array in the system's memory (not shown).

The motion vector 140 represents the distance between a block of data in a reference framestore and the block of data's position in a new frame being constructed. The reference frame is used as a reference from which the image is reconstructed. In a preferred embodiment of the present invention the reference frame comprises the I- and P-framestores 113, 115, respectively. The present invention adjusts the motion vector 140 in accordance with the scale factor, discussed above.

Because the motion vector 140 contained in the image stream 102 corresponds to a full scale image, that is the scale factor equals 1, it must be scaled in order to work with the reduced-size arrays of the present invention. According to a preferred embodiment of the present invention, the reference frames have been scaled according to the scale factor. Without such scaling, the motion vector 140 sent by an encoder (not shown) would be incompatible with the reduced size arrays of the present invention. This is because the encoder expected the system 100 to process full-size image component arrays.

A scale adjustment module 104 provides scaling of the motion vector 140. In the preferred embodiment of the present invention, the scale adjustment module 104 multiplies the motion vector 140 by the scale factor. Because the scale factor is a fraction, the multiplication is equivalent to a division. For scale factors which are a power-of-two, i.e., ½, ¼, ⅛, etc., the division is accomplished by shifting a binary point left to preserve the low-order bits of the vector for the fractional portion. The division is more complex where the divisor is not a power of two. Such division, however, is well known in the art. The scale adjustment module 104 outputs a scaled motion vector 142.

The scaled motion vector 142 acts as an index into a reduced volume framestore 108 via a framestore address generator 107. The reduced volume framestore 108 preferably stores one or more framestores that are required for processing by a preferred embodiment of the present invention. For example, the reduced volume framestore 108 for a conventional MPEG-2 implementation, comprises two framestores an I-framestore 113 and a P-framestore 115. The reduced volume framestore 108 has a reduced volume because only the image components required for the reduced size image are stored in the reduced volume framestore 108. For example, if the scale factor is ¼, the reduced volume framestore 108 would require only one sixteenth of the storage of a conventional MPEG-2 system. This memory reduction is an advantage of the present invention.

The framestore address generator 107 receives a scaled motion vector 142. It then determines integral components 146 and fractional components 144 of the received scaled motion vector 142. The framestore address generator 107 outputs the integral components 146 to the reduced volume framestore 108. The integral components 146 so output are used to address a block of image components 143 in either the I- or P-framestore. The framestore address generator 107 also outputs the fractional components 144 of the scaled motion vector 142 to a nonlinear filter 106. The fractional components 144 are output to the nonlinear filter 106 for use in its estimation operation (described below).

The block of image components 143 addressed by the integral components 146 is output from the reduced volume framestore 108, either I-framestore 113 or P-framestore 115, to the nonlinear filter 106. The nonlinear filter 106 filters the block of image components 143 in each dimension which has a non-zero motion vector. For example, for a block with both vertical and horizontal motion vectors, the nonlinear filter 106 filters both horizontally and vertically. During the filtering operation, block boundary effects may be accounted for in a well known manner. For example, it is well known to use pixels adjacent to a block boundary in both the horizontal and vertical directions to account for boundary effects. Furthermore, image boundary effects may be accounted for in a well known manner. For example, image boundary pixels may be replicated during filtering. Filtering is based on the value of the fractional components 144 received from the framestore address generator 107.

In a preferred embodiment of the present invention, the nonlinear filter 106 comprises a look-up table (LUT) 147. The LUT 147 contains filter coefficients for filtering the block of image components 143 it receives from the reduced volume framestore 108. The value of the fractional components 144 is used as an index into the LUT 147. The LUT 147 outputs a set of filter coefficients to be used by the nonlinear filter 106.

It would be apparent to one skilled in the art to which the present invention pertains that the LUT 147 can be replaced by a computation unit. Such a computational unit calculates the nonlinear filter 106 coefficients dynamically based on system specific parameters (e.g., for narrower or wider filters).

The nonlinear filter 106 determines the value of an image component corresponding to the fractional horizontal and vertical displacement indicated by the scaled motion vector 142 from an actual image component location in the framestore. Thus, by using nonlinear filter 106, image component values may be estimated for those positions indicated by scaled motion vector 142 that do not exactly correspond to a framestore location.

It would be apparent to one skilled in the art to which the present invention pertains that the decimation process, discussed below with reference to reduced size IDCT 114, acts as a further low pass filter on the data. This effect is offset, however, by nonlinear filter 106, which acts as a sharpening filter. Thus, nonlinear filter 106 may be any filter which both sharpens an image and estimates the value of image components in between actual image components.

In the preferred embodiment of the present invention, the nonlinear filter 106 is a cubic filter. A cubic filter for use in the preferred embodiment of the present invention can be found in GEORGE WOLBERG, DIGITAL IMAGE WARPING, Section 5.4.3, page 128–31 (IEEE Computer Society Press 1990). Application of such a filter to a block of image components is well known in the art.

The output of nonlinear filter 106 is a block of predicted terms 122 for a given block of data. The block of predicted terms 122 is combined (discussed below) with a block of error terms 124 (discussed below) to yield a block of display pixels 118. The block of display image components 118 is stored in a display framestore 121. The block of display image components replaces the corresponding block of display pixels in display framestore 121.

The system must update I- and P-framestores 113, 115 that are stored in the reduced volume framestore 108 after the display framestore 121 has been updated. To perform this update, the display framestore 121 replaces either the I-framestore 113 or P-framestore 115, whichever is appropriate, in reduced volume framestore 108, if the contents of framestore 121 comprise a new reference frame. It would be apparent to one skilled in the art to which the present invention pertains that the disclosed system can be applied to B-frames. Such B-frames, for example, can be found in MPEG-2 video streams.

In addition to using the scale factor to properly scale the motion vector 140, the present invention properly handles error terms 124 transmitted in the form of DCT coefficients 130. The DCT coefficients 130 represent the spatial frequency of the error terms 124 being transmitted in image stream 120. Lower spatial frequencies contain the primary information content of the error terms. Lower frequencies are typically transmitted in the upper left quadrant of a DCT coefficient array, beginning with element (0,0) of the n×m block of DCT coefficients 130. Frequency increases moving radially outward from the (0,0) coordinate. In conventional MPEG-2 systems, the order of the DCT coefficients 130 in the array is "zigzagged" so as to reduce the length of zero runs in an image.

Referring to FIG. 1, DCT coefficients 130 are passed through a zigzagger 110. The zigzagger 110 is well-known and is described in the MPEG-2 specification referenced above. The zigzagger 110 inverse scans the DCT coefficients 130. The inverse scan "zigzags" because the DCT coefficients 130 are ordered in MPEG-2 image stream 102 to keep runs between nonzero terms short, thereby placing the DCT coefficients 130 with the most energy in the upper left quadrant. This ordering takes the "zigzag" form described in the MPEG-2 specification. Two such orderings are defined in the MPEG-2 specification. The operation of zigzagger 110 is not the subject of the current invention and will not be described further. In an alternative preferred embodiment of the present invention, zigzagger 110 is not required. In this alternative preferred embodiment, the DCT coefficients 130 are passed to a DCT coefficient filter 111 directly from image stream 102. Thus, the order of the DCT coefficients 130 is not important to the operation of the present invention. It may however, be important for specific implementations, such as the embodiment described above employing the optional zigzagger 110. It would be apparent to one of ordinary skill in the art that alternative orderings could be employed that are different than those for use with a zigzagger 110 as defined in the MPEG-2 specification. Thus, the well-known zigzagger 110, is but one type of a more general class of reordering modules. The more general class may not be well-known.

The DCT coefficient filter 111 filters reordered DCT coefficients 132. According to a preferred embodiment of the present invention, the DCT coefficients 130 corresponding to high frequencies are discarded, that is, set equal to zero. This results in a reduced size coefficient array. As will be readily understood by those skilled in the art, the effect of this operation is to low pass filter the data. The amount discarded is dependent upon the scale factor. For example, retaining a 3×3 array is sufficient for a scale factor of one half; retaining a 2×2 block is sufficient for a scale factor of one quarter, etc. It should be noted that the correspondence of the amount discarded to the scale factor may change across applications of the present invention. Thus, in one application a scale factor of ½ may provide the best results for a 3×3 array. In another application, however, a 4×4 array may be best.

Zeroing particular DCT coefficients 130 results in a reduced size coefficient block for subsequent processing. The reduced size can be any n×m block where the value of n, as well as the value of m, can be less than the conventional size of the image stream 102. For example, in MPEG-2, the conventional size is 8×8. Thus, n and or m are set to less than 8. Note that n and m are both integers.

The DCT coefficient filter 111 outputs a reduced size DCT coefficients. The array size of array 134 is n×m, based on the scale factor.

Because the number of DCT coefficients 130 has been reduced, subsequent processing requires less storage (if the physical size of the arrays are reduced) and fewer computations (no computations are required for the values that have been set to zero). Therefore, in the preferred embodiment of the present invention, a reduced size inverse quantizer (IQTZ module) 112 replaces the conventional 8×8 IQTZ in conventional MPEG-2 decoders. The IQTZ module 112 performs a similar operation to a conventional MPEG-2 IQTZ, but operates on less data. The IQTZ module 112 outputs reduced quantized DCT coefficients 136.

Because the output of IQTZ module 112 is of reduced size, a reduced size inverse discrete cosine transform (IDCT module) 114 replaces the conventional 8×8 IDCT found in conventional MPEG-2 decoders. The IDCT module 114 performs a similar operation to a conventional MPEG-2 IDCT, but operates on less data, and thus more efficiently.

According to the preferred embodiment of the present invention, IDCT module 114 performs a decimating function in addition to computing the IDCT. The decimating function is accomplished by skipping spatial coordinates when computing the IDCT. The spatial coordinates to skip are determined in accordance with the scale factor. For example, consider the case where the smaller image is one eighth the size of the full image. Further, assume that the image is one quarter the size in the horizontal direction and one half the size in the vertical direction. In this case, the preferred embodiment of the present invention calculates the IDCT for only every fourth spatial domain pixel in the horizontal direction and every other spatial domain pixel in the vertical direction. Through the process of decimation, the present invention maintains the ratio of small image to full image. The output of IDCT module 114 comprises the error terms 124.

Combiner 116 combines predicted term 122 and error terms 124. In a preferred embodiment of the present invention, combiner 116 is a summer. The summer adds each predicted term 122 with its corresponding error term 124. The combiner 116 outputs a block display image components 118.

The block of display image components 118 are input to display framestore 121. The block of display image components 118 replaces a block of display image components in the display framestore 121. The replacement takes place at an address indicated by the position of the error terms in the original frame. Display framestore 121 may be used to update either I-framestore 113 or P-framestore 115 in reduced volume framestore 108.

It would be apparent to one of ordinary skill in the art that I-framestore and P-framestore may be thought of as examples of a reference framestore. Thus, the terminology "I-framestore" or "P-framestore" may be read to refer to a reference framestore in the general case.

The foregoing operations occur for each block of image components, 8×8 in MPEG-2 designs, that requires updating. The operations must be capable of updating a new display framestore 121 at a rate compatible with the display device (e.g., television screen or computer monitor).

From the foregoing description, it is observed that the present invention operates on reduced size arrays from the conventional MPEG-2 8×8 array. It should be noted that there is no requirement that the array size be square. Thus, the present invention can be applied to an array structure having a size of 4×6, for example. Furthermore, the present invention can be scaled without loss of generality. Thus, if the MPEG standard changes from the current 8×8 standard to a n×n standard, then reduced size arrays, i.e., having at least one dimension less than n and no dimension greater than n, can be formed according to the present invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for scaling an image contained in an image stream, wherein the image stream comprises a motion vector used to scale the image, and a block of error terms to scale the image, comprising the steps of:
   (1) separating a block of data corresponding to a frequency domain representation of the block of error terms from the image stream;
   (2) low pass filtering said frequency domain representation according to a scale factor to produce a reduced-size low pass filtered block;
   (3) inverse quantizing said reduced-size low pass filtered block to produce a reduced-size inverse quantized block;
   (4) selectively transforming said reduced-size inverse quantized block to a spatial domain representation according to said scale factor to produce a decimated representation of the block of error terms;
   (5) separating the motion vector from the image stream;
   (6) scaling the motion vector according to a scale factor, thereby producing a scaled motion vector;
   (7) addressing an image framestore with said scaled motion vector to obtain a block of image components corresponding to said scaled motion vector;
   (8) nonlinear filtering said block of said image components with a nonlinear filter, thereby producing a block of predicted terms; and
   (9) using one of said block of error terms, said block of predicted terms, or a combination of said block of error terms and said block of predicted terms to form a block of display pixels.

2. The method of claim 1, wherein steps (1)–(4) occur substantially simultaneously with steps (5)–(8).

3. The method of claim 1, wherein steps (1)–(4) occur asynchronously with steps (5)–(8).

4. A method for scaling an image contained in an image stream according to a scale factor, wherein the image stream comprises a motion vector, comprising the steps of:
   (1) separating from the image stream a block of data corresponding to a frequency domain representation of a block of error terms;
   (2) low pass filtering said frequency domain representation according to the scale factor to produce a reduced-size low pass filtered block;
   (3) inverse quantizing said reduced-size low pass filtered block to produce a reduced size inverse quantized block;
   (4) selectively transforming said reduced-size inverse quantized block to a spatial domain representation according to the scale factor to produce a decimated representation of said block of error terms;
   (5) separating the motion vector from the image stream;
   (6) scaling the motion vector according to the scale factor to produce a scaled motion vector;
   (7) outputting from a framestore a block of image components identified by an integer component of said scaled motion vector;
   (8) filtering said block of image components outputted from said framestore using a nonlinear filter, thereby producing a block of predicted terms; and
   (9) using one of said block of error terms, said block of predicted terms, or a combination of said block of error terms and said block of predicted terms to form a block of display pixels.

5. The method of claim 4, wherein said filtering step further comprises the step of using a fractional component of said scaled motion vector to determine a set of filter coefficients.

6. The method of claim 5, wherein said fractional component of said scaled motion vector is used as an index into a look-up table comprising a plurality of filter coefficients.

7. The method of claim 4, wherein steps (1)–(4) occur substantially simultaneously with steps (5)–(8).

8. The method of claim 4, wherein steps (1)–(4) occur asynchronously with steps (5)–(8).

9. A system for scaling an image contained in an image stream, wherein said image stream comprises a motion vector and a block of error terms, comprising:
   a framestore having image components stored therein;
   a scale adjustment module to scale the motion vector according to a scale factor to produce a scaled motion vector, wherein an integer component of said scaled motion vector is provided to said framestore, and said framestore outputs a block of image components identified by said integer component of said scaled motion vector;

a first filter to filter said block of image components outputted from said framestore and to output a block of predicted terms, wherein said first filter is a nonlinear filter;

a second filter to low pass filter a frequency domain representation of the block of error terms according to said scale factor to produce a reduced-size low pass filtered block of error terms;

an IQTZ module to inverse quantize said reduced-size low pass filtered block of error terms to produce a reduced-size inverse quantized block of error terms;

an IDCT module to transform said reduced-size inverse quantized block of error terms to a spatial domain representation according to said scale factor to produce a decimated representation of the block of error terms.

10. The system of claim 9, wherein a fractional component of said scaled motion vector is provided to said first filter, wherein said first filter uses said fractional component in filtering said block of image components outputted from said framestore.

11. The system of claim 10, wherein said first filter determines a set of filter coefficients based on said fractional component of said scaled motion vector.

12. The system of claim 11, wherein said first filter comprises a look-up table comprising a plurality of sets of filter coefficients, wherein said fractional component of said scaled motion vector is used as an index into said look-up table.

13. The system of claim 11, wherein said first filter comprises a computation unit to determine said set of filter coefficients.

14. The system of claim 9, further comprising:

a summer to add each predicted term in said block of predicted terms with a corresponding error term to produce a block of display image components;

a display framestore to store said block of display image components; and means for displaying said block of display image components.

* * * * *